B. DAHL.
CONDUIT FISH WIRE MACHINE.
APPLICATION FILED JUNE 15, 1912.
1,076,870. Patented Oct. 28, 1913.
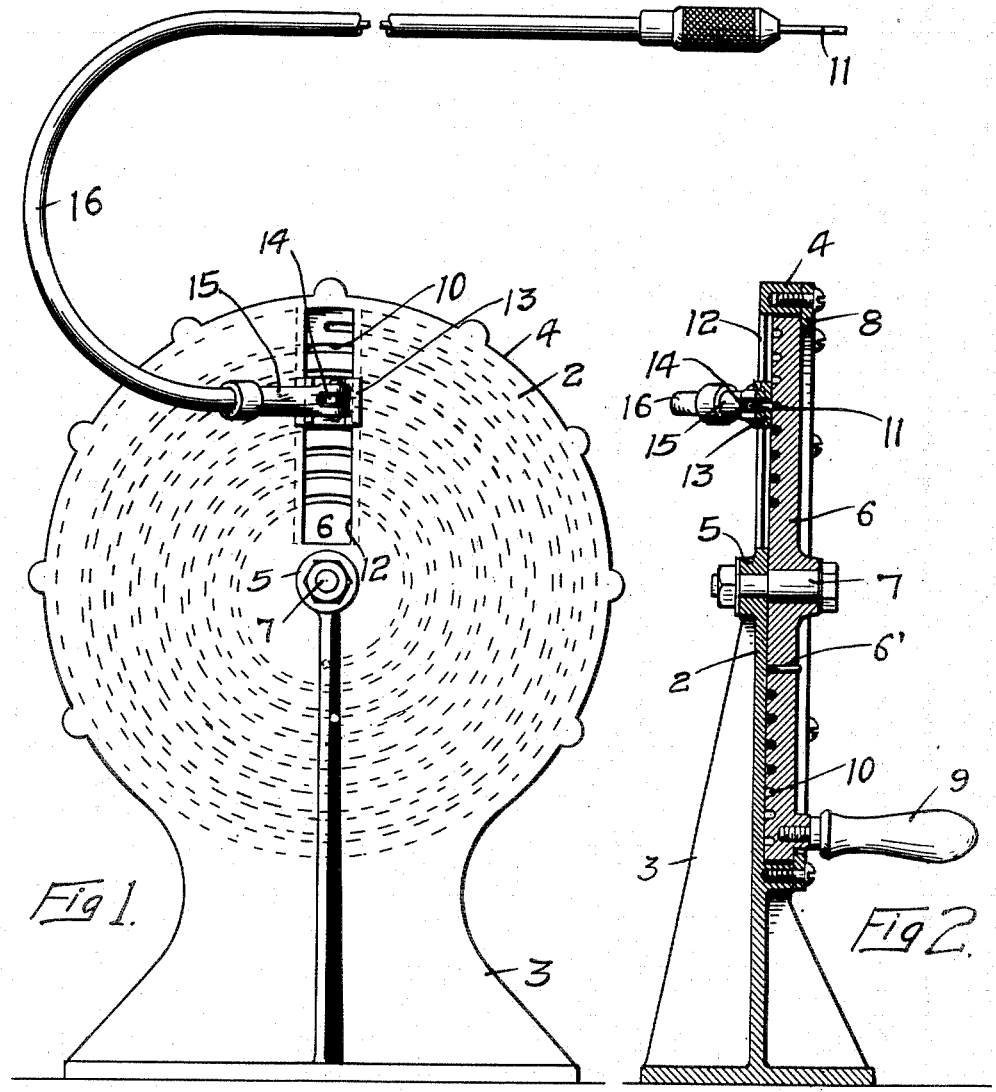
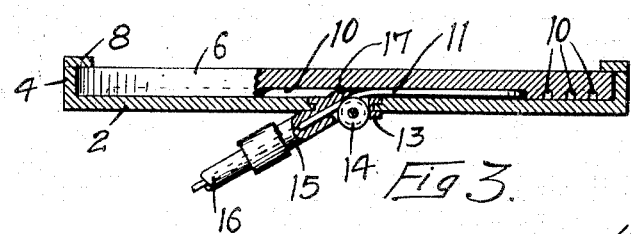
WITNESSES
INVENTOR
BENJAMIN DAHL
BY
ATTORNEYS

UNITED STATES PATENT OFFICE.

BENJAMIN DAHL, OF MINNEAPOLIS, MINNESOTA.

CONDUIT FISH-WIRE MACHINE.

1,076,870. Specification of Letters Patent. Patented Oct. 28, 1913.

Application filed June 15, 1912. Serial No. 703,928.

*To all whom it may concern:*

Be it known that I, BENJAMIN DAHL, of Minneapolis, Hennepin county, Minnesota, have invented certain new and useful Improvements in Conduit Fish-Wire Machines, of which the following is a specification.

The object of my invention is to provide a machine of simple, durable construction by means of which a fish wire can be easily and quickly fed into a conduit.

A further object is to provide a machine which will prevent the wire from kinking or buckling and will require practically no attention on the part of the operator when the machine is in use.

The invention consists generally in various constructions and combinations, all as hereinafter described and particularly pointed out in the claims.

In the accompanying drawings forming part of this specification, Figure 1 is a side view of a conduit fish wire machine embodying my invention, Fig. 2 is a vertical sectional view of the same, Fig. 3 is a horizontal sectional view.

In the drawing, 2 represents a casing or frame having supporting legs 3. This casing is preferably in the form of a circular disk having a peripheral flange 4 and a centrally arranged hub 5.

6 is a flat disk, also circular in form, fitting within the flange 4 and seated against the face of the disk or casing 2 and adapted to revolve on a stud 7 that is mounted in the hub 5. A ring 8 holds the disk 6 in place within the flange 4 and allows it to turn freely on the stud 7. A handle 9 is mounted on the disk 6 for convenience of rotation. The inner face of the disk 6 is provided with a spiral recess or groove 10 extending from a point near the center of the disk spirally to the periphery thereof, this groove or recess being of sufficient depth to receive a fish wire 11 inserted therein. By the term "fish wire" I mean a steel wire of suitable gage to be fed through the conduit into which it is desired to introduce the cable.

The casing 2 is provided with a radial opening 12 extending transversely of the groove 10 and a carriage 13 is slidably mounted in guides in said recess and adapted to move back and forth therein. This guide is provided with an anti-friction roller 14 with which the fish wire contacts, and a tube 15, preferably of metal, is mounted at one end in said carriage and projects outwardly therefrom, and into this tube the outer end of the fish wire is inserted. A flexible continuation 16 of the tube is provided, having one end mounted on the tube 15 and the other end carried to any suitable point where it is desired to feed the fish wire into the conduit. The carriage has a projection 17 thereon which is adapted to fit into the spiral groove in the face of the disk 6 so that as the disk is revolved the carriage will move radially in its guides with respect to the disk. As the carriage moves over the periphery toward the center of the disk, it is evident that the operator will have a gradually increasing leverage on the wire as the carriage approaches the center of the disk. This is important, as obviously the friction of the wire in the conduit will increase in proportion to the unwinding or unreeling of the wire as it is introduced into the conduit. On the return movement or rewinding of the wire the friction will be greatest at the start and gradually decrease as the wire is re-wound and the carriage approaches the periphery of the disk. The leverage of the operator will decrease as the wire is re-wound, being greatest at the starting point and decreasing as the friction of the wire decreases.

The end of the wire 11 is thrust into the socket 6' near the hub of the disk and is held stationary therein, and the wire is coiled in the spiral groove and its outer end thrust into the guide on the radially moving carriage. As the disk 6 is revolved to feed the wire the convolutions of the wire will bear on the walls of the groove and be prevented thereby from bending or buckling, and during the outward feed of the wire it will press on the outer wall of the groove and when the wire is reeled up on the disk the pressure will be on the inner wall of the groove. I am thus able to prevent contact of the coils or convolutions of the wire with one another, prevent the wire from bending or buckling during the feeding operation, and insure the rapid feed of the wire or the re-coiling of the same with comparatively little effort on the part of the person revolving the disk.

Obviously, the disk may be made in various sizes and there may be any suitable number of convolutions of the groove therein according to the desired length of the fish wire, and in various other ways the details of construction may be modified without departing from the spirit of my invention.

I claim as my invention:—

1. A machine of the class described comprising a stationary disk having a radial opening therein, a carriage slidable in said opening and having a guide, and a revolving fish wire carrier contiguous to said carriage, substantially as described.

2. A machine of the class described comprising a supporting frame, a disk revolubly mounted therein and having a spirally arranged groove in its surface and a wire adapted to fit within said groove, a radially moving carriage having a guide to receive the end of said wire, and a part to fit within said groove, whereby when said disk is revolved said carriage will be moved radially to unwind or re-wind the wire.

In witness whereof, I have hereunto set my hand this 11th day of June, 1912.

BENJAMIN DAHL.

Witnesses:
GENEVIEVE E. SORENSEN,
EDWARD A. PAUL.